July 29, 1930.                T. H. THOMAS                1,771,425
ELECTRIC SIGNAL SYSTEM
Filed Aug. 12, 1927
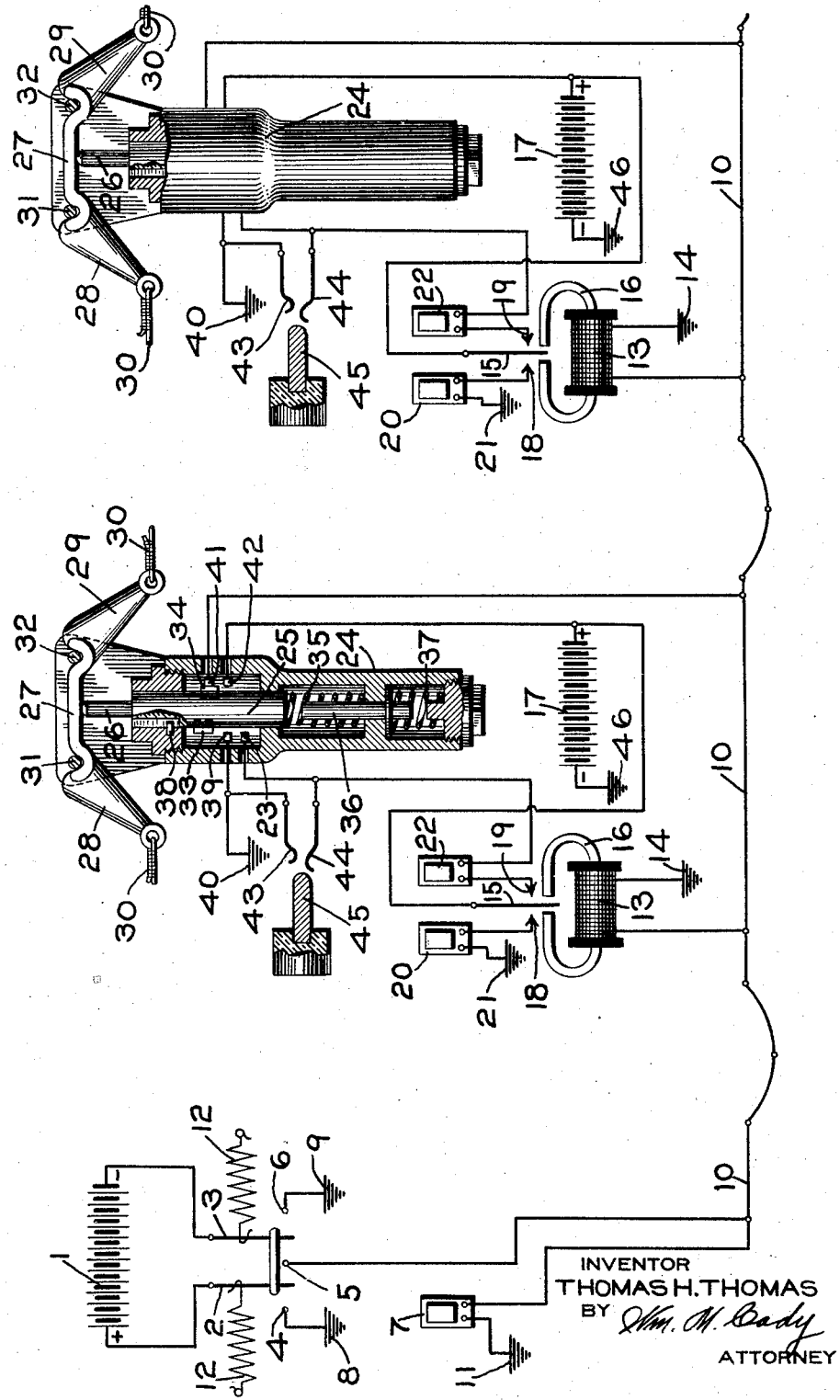
INVENTOR
THOMAS H. THOMAS
BY
ATTORNEY Patented July 29, 1930

1,771,425

UNITED STATES PATENT OFFICE

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

ELECTRIC SIGNAL SYSTEM

Application filed August 12, 1927. Serial No. 212,438.

This invention relates to signal systems, and more particularly to an electric signal system adapted for use on railway trains.

An object of my invention is to provide an electric train signal system by the use of which a trainman may signal the engineman from any car of a train and by which the engineman may cause his reply signal to be transmitted to the car station from which the trainman's signal originated and further by which the engineman may signal all of the car stations on the train.

Another object of the invention is to provide an electric signal system for railway trains, which comprises an electric circuit controlled from the locomotive or a controller car of the train, adapted to control two electric circuits on a car of the train, each of the two circuits embodying a signal indicating device.

These and other objects and advantages will appear in the following more detailed description of the invention.

In the accompanying drawing, the single figure is a diagrammatic view of a train signal system embodying my invention.

According to my invention, the locomotive or controller car of a railway train, is provided with a source of electric current such as a battery 1, an engineman's switch having spaced contact arms 2 and 3 and spaced contact points 4, 5, and 6, and is further provided with a signal indicating device such as an electric buzzer 7.

The contact points 4 and 6 are each connected to ground at 8 and 9 respectively, while the contact 5 is connected to the train wire 10 which extends throughout the length of the train. One terminal of the buzzer 7 is connected to the train wire 10 and the other terminal to ground at 11. The switch arms 2 and 3 are connected with the positive and negative terminals, respectively, of the battery 1, such arms being movable by the engineman to positions in which they will contact with the contact points 4 and 5 respectively and connect the positive terminal of the battery to ground 8 and the negative terminal of the battery to the train wire 10 and also being movable to positions in which they will contact with the contact points 5 and 6 respectively and connect the positive terminal of the battery to the train wire 10 and the negative terminal to ground 9. These switch arms are normally out of contact with the contact points 4, 5, and 6 and are yieldably held in such positions by springs 12.

Each car of the train may be provided with a polarized relay device having one end of its coil 13 connected to the train wire 10 and the other end connected to ground at 14, which coil is adapted to be supplied with current from the battery 1 when the engineman's switch is operated to signal to the trainman. When no current is passing through the coil 13 the armature 15 of the relay device will be in the position between the ends of the core 16, as shown in the drawing.

The armature of the relay device is connected with the positive terminal of a battery 17 or other source of electric current on the car and is adapted to be moved into engagement with a contact 18 or a contact 19. The contact 18 is connected with one terminal of a signal indicating device, such as a buzzer 20, the other terminal being connected to ground at 21. The contact 19 is connected with one terminal of a signal indicating device such as a buzzer 22, the other terminal being connected with a terminal contact 23 arranged in a casing 24 of a trainman's switch.

The casing 24 of the trainman's switch contains a sliding contact 25 having an operating stem 26 adapted to be operated by a lever 27 having operating arms 28 and 29, each having an operating cord 30 connected therewith. Mounted on the casing there are fulcrum pins 31 and 32 which are so disposed that when the arm 28 is operated the lever 27 turns about the fulcrum pin 31 to operate the stem 26, and when the arm 29 is operated, the lever turns about the fulcrum pin 32 to operate the stem 26.

The contact member 25 is provided with contacts 33 and 34 and is normally maintained in the position shown in the drawing by the action of a spring 35 mounted in the casing. This member 25, when it is moved a predetermined distance, engages a yielding stop member 36 which is subject to the pressure of a spring 37. In order to prevent rotative movement of the contact member 25, a guide bushing having screw-threaded engagement with the casing 24, is provided with a pin 38 which engages in a groove formed in the contact member.

The contact 33 controls circuit wires connected to the contact terminal 23, and to a terminal contact 39 connected to ground at 40. The contact 34 controls circuit wires connected to a terminal contact 41 connected to the train wire 10, and to a terminal contact 42 connected to the positive terminal of the battery 17 or other source of electric current.

On each car of the train a jack may be provided having spaced tines 43 and 44, the tine 43 being connected to the wire leading from the terminal contact 39 to ground 40 and the tine 44 being connected to the wire leading from one terminal of the buzzer 22 to the terminal contact 23. To electrically connect these tines, a plug 45 may be employed which when inserted between them forms a connection from the buzzer 22 to ground 40. The plug 45 is inserted between the tines of the jack on each car of the train at which it is desired to receive signals originated by the engineman.

Assuming the several parts of my invention to be in their normal positions, as shown in the drawing, and the trainman desires to signal the engineman, the trainman pulls the operating cord 30 until the contact member 25 engages the stop member 36, in which position, the contact 34 connects the contact terminals 41 and 42, which permits current to flow from the positive terminal of the battery 17 through the train wire 10 and buzzer 7 to ground 11, and as the negative terminal of this battery is connected to ground at 46, a circuit is completed so that the buzzer 7 on the locomotive will operate.

If the trainman desires to receive the engineman's reply signal at the car station from which he initiated his signal, he causes the contact member 25 to be moved to its second position in which the contact 33 connects the terminal contacts 23 and 39, thus connecting one terminal of the buzzer 22 to ground 40. When the contact member 25 is in this position the contact 34 will have been moved out of connecting engagement with the terminal contacts 41 and 42, so that the battery 17 will not be connected to the train wire 10. If the trainman does not wish to hold the contact member 25 in its second position while awaiting the engineman's signal, he inserts the plug 45 between the tines 43 and 44 of the jack, thus forming a connection from one terminal of the buzzer 22 to ground 40, he then releases his pressure on the cord 22 and permits the springs 35 and 37 to move the contact member back again to its normal position shown in the drawing, in which position, none of the terminal contacts in the casing 24 are connected together. The trainman may, if he so desires, insert plugs 45 in any number of cars on which he desires the engineman's reply signal to be sounded.

To reply to the trainman's signal, the engineman moves the switch arms 2 and 3 to positions in which they contact with the switch points 5 and 6, respectively, thus connecting the positive terminal of the battery 1, on the locomotive, to the train wire 10 and the negative terminal to ground 9, which permits current to flow from the battery through the train wire 10 and coil 13 of the relay device to ground 14. The current flowing through the coil 13 in this direction causes the armature to swing toward the right a sufficient distance that it will contact with the contact 19, thus closing a circuit from the battery 17 on a car through the armature 15, buzzer 22 and trainman's switch or jack to ground 40, and current flowing through this circuit causes the buzzer 22 to operate.

If the engineman desires, he may cause his signal to be sounded on every car of the train independent of the trainman's switch or trainman's jack and this is accomplished by the engineman moving the switch arms 2 and 3 to the left into contact with the switch points 4 and 5, respectively, which causes the positive terminal of the battery 1 to be connected to ground 8 and the negative terminal to the train wire 10, which permits current from the battery to flow through ground 8 on the locomotive and ground 14 on a car and through the coil 13 of the polarized relay device, and current flowing in this direction, which is reverse to that just described in connection with the engineman's reply signal, causes the armature 15 to move toward the left a sufficient distance that it will contact with a contact 18 connected with the buzzer 20, thus a circuit is completed from the battery 17 through the armature 15, buzzer 20 to ground 21 and current flowing through this circuit will cause the buzzer 20 to operate.

It will be noted that when the engineman operates his switch to reply to a trainman's signal or when the engineman initiates a signal to sound on every car of the train, the buzzer 7 being connected to the train wire 10 and to ground 11, will also be caused to operate.

Having now described my invention, what I claim as new and desire to secure by Letters Patent, is:—

1. In a train signal system, the combination with two electrically controlled signal indicating devices on one of the vehicles of a train, one of the signal indicating devices being permanently connected to ground and the other being normally disconnected from ground, of an electric circuit for each of said devices, a switch device operative to a position to connect the ungrounded signal indicating device to ground, a source of current on said vehicle normally out of circuit with both of said devices, a train wire, means connected with said train wire and ground operative by current flowing therethrough in one direction for connecting said source of current in circuit with the permanently grounded signal device and operative by current flowing therethrough in the opposite direction for connecting said source of current in circuit with the other of said devices when the device is connected to ground through said switch device, a source of current on another vehicle of the train, and a switch on said other vehicle operative to control the directional flow of current from the last mentioned source through said train wire and means.

2. In a train signal system, the combination with two electrically controlled signal indicating devices on one of the vehicles of a train, one of said signal indicating devices being permanently connected to ground and the other normally disconnected from ground, of an electric circuit for each of said devices, a switch device operative to connect the ungrounded signal indicating device to ground, a source of current on said vehicle normally out of circuit with both of said devices, a train wire, means connected with said train wire and ground operative by current flowing in one direction for connecting said source of current in circuit with the permanently grounded device and operative by current flowing in the opposite direction for connecting said source of current in circuit with the other of said devices when it is connected to ground through said switch device, a source of current on another vehicle of the train for supplying current to said means, and a switch on said other vehicle operative to control the directional flow of current from the last mentioned source of current.

3. In a train signal system, the combination with a plurality of electric circuits on one vehicle of a train and each circuit including a signal indicating device, one of the signal indicating devices being permanently connected to ground and the other being normally disconnected from ground, of a switch device on said vehicle operative to a position to connect the ungrounded signal indicating device to ground, a source of current on said vehicle, a train wire, means connected to said train wire and to ground operative to connect said source of current into circuit with the grounded signal indicating device and operative to complete the circuit through the other of said devices when the device is grounded, a source of current on another vehicle, and means on the last mentioned vehicle operative to connect the last mentioned source of current to said train wire and to ground to control the flow of current through the first mentioned means.

4. In a train signal system, the combination with a plurality of electric circuits on one vehicle of a train and each circuit including a signal indicating device, one of the signal indicating devices being permanently grounded and the other being normally disconnected from ground, of a trainman's switch device operative to connect the ungrounded signal indicating device to ground, a source of current on said vehicle, a train wire, a relay device connected to said train wire and to ground, a source of current on another vehicle of the train, a switch device on the last mentioned vehicle operative at one time to connect the last mentioned source of current to ground and to said train wire to operate said relay device to connect the first mentioned source of current in circuit with the permanently grounded signal indicating device and operative at another time to reverse the directional flow of current through said relay device and train wire to operate said relay device to connect the first mentioned source of current into circuit with the other of said signal indicating devices when the circuit through the trainman's switch device is closed.

5. In a train signal system, the combination with a plurality of electric circuits on one vehicle of a train, of a signal indicating device included in each of said circuits, one of the signal indicating devices being permanently connected to ground and the other being normally disconnected from ground, a trainman's switch device on said vehicle operative to connect the ungrounded signal indicating device to ground, a source of current, means subject to the flow of an electric current in one direction for connecting said source of current into circuit with the permanently grounded signal indicating device and subject to the flow of an electric current in the opposite direction for connecting said source of current into circuit with the other of the signal indicating devices when the circuit is closed by said trainman's switch device, a source of current on another vehicle of the train, and a switch device on the last mentioned vehicle for controlling the flow of current from the last mentioned source to said means over the circuit including the train wire.

6. In a train signal system, the combination with a plurality of electric signal indicating devices on one vehicle of a train, an electric circuit for each of said signal devices, one of said devices being permanently connected to ground and the other being normally disconnected from ground, a source of current permanently connected to ground, a polarized relay device operative to connect said source of current in circuit with the permanently grounded signal indicating device and to the other of said devices, a switch on said vehicle operative to connect the ungrounded signal device to ground to complete the circuit through the signal device, a source of current on another vehicle of the train, and a switch on the last mentioned vehicle operative to supply current from the last mentioned source of current to said means to control the operation of said circuits.

7. In a train signal system, the combination with two electrically controlled signal indicating devices on one vehicle of a train, one of said devices being permanently connected to ground and the other being normally disconnected from ground, a source of current on said vehicle permanently connected to ground, a signal indicating device on another vehicle of the train permanently connected to ground, a switch device on the first mentioned vehicle having a position for connecting said source of current in circuit with the last mentioned signal device and having another position for grounding the signal indicating device which is normally disconnected from ground, a polarized relay device operative to connect said source of current into circuit with the first mentioned permanently grounded signal indicating device and to complete the circuit through the other of the first mentioned signal indicating devices when the circuit through said switch device is closed, a source of current on said other vehicle of the train, and a switch device on said other vehicle operative for controlling the polarity of the current from the last mentioned source of current to said polarized relay device.

8. In a train signal system, the combination with two signal indicating devices on one vehicle of a train, one of said signal indicating devices being permanently connected to ground and the other being normally disconnected from ground, of a train wire, a signal indicating device on another vehicle of the train permanently connected to said train wire and to ground, a polarized relay device connected to said train wire and ground, a source of current on the first mentioned vehicle permanently connected to ground, a switch device on the first mentioned vehicle operative to a position to connect said source of current to said train wire to operate the signal indicating device connected to said train wire and operative to another position to connect the ungrounded signal indicating device to ground, a source of current on the second mentioned vehicle and a switch operative to one position to close the circuit through the last mentioned source of current and relay device to operate said relay device to connect the first mentioned source of current into circuit with the first mentioned permanently grounded signal indicating device on the first mentioned vehicle and operative to a different position to complete the circuit through the first mentioned source of current and the said normally ungrounded signal indicating device when the device is connected to ground by the first mentioned switch device.

9. In a train signal system, the combination with two electrically controlled signal indicating devices on one of the vehicles of a train, one of said devices being permanently connected to ground and the other being normally disconnected from ground, a trainman's switch device operative to connect said other signal indicating device to ground, a source of current on said vehicle normally out of circuit with both of said devices, a train wire, means connected with said train wire and ground operative by current flowing therethrough in one direction for connecting said source of current in circuit with one of said signal indicating devices and operative by current flowing therethrough in the opposite direction for completing the circuit through said source of current and the other of said signal indicating devices when the trainman's switch device connects the signal device to ground, a source of current on another vehicle of the train for supplying current to said means, and a switch device on the last mentioned vehicle operative to connect the last mentioned source of current in circuit with said train wire and means and for reversing the polarity of the current flowing through said means.

10. In a train signal system, the combination with two electrically controlled signal indicating devices on one of the vehicles of a train, one of said devices being permanently connected to ground and the other being normally disconnected from ground, a trainman's switch device on said vehicle operative to connect said other signal indicating device to ground, a source of current on said vehicle normally out of circuit with both of said signal indicating devices, a source of current on another vehicle of the train, a train wire, means connected to said train wire and ground operative by an electric current flowing therethrough in one direction for completing the circuit through the first mentioned source of current and the grounded signal indicating device and operative by current flowing therethrough in the opposite direction for completing the circuit through the other signal indicating device when said trainman's switch device is connecting the signal device to ground, and an engineman's switch device on the second mentioned vehicle operative to connect the second mentioned source of current to ground and said train wire to control the directional flow of current through said means.

In testimony whereof I have hereunto set my hand.

THOMAS H. THOMAS.